United States Patent
Palkisto

(10) Patent No.: US 6,505,047 B1
(45) Date of Patent: Jan. 7, 2003

(54) REDUCTION OF SIGNALING LOAD IN PACKET RADIO NETWORK

(75) Inventor: Virpi Palkisto, Masala (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/402,164
(22) PCT Filed: Feb. 8, 1999
(86) PCT No.: PCT/FI99/00089
§ 371 (c)(1),
(2), (4) Date: Dec. 27, 1999
(87) PCT Pub. No.: WO99/41928
PCT Pub. Date: Aug. 19, 1999

(30) Foreign Application Priority Data

Feb. 10, 1998 (FI) .................................................. 980302

(51) Int. Cl.⁷ ............................................... H04Q 7/22
(52) U.S. Cl. ........................ 455/456; 455/432; 455/435; 370/401
(58) Field of Search ................................ 455/432, 435, 455/445, 456, 440, 433; 370/401–409

(56) References Cited

U.S. PATENT DOCUMENTS

| | | | | |
|---|---|---|---|---|
| 6,081,723 A | * | 6/2000 | Mademann | 455/456 |
| 6,104,929 A | * | 8/2000 | Josse et al. | 455/445 |
| 6,115,615 A | * | 9/2000 | Ota et al. | 455/553 |
| 6,119,012 A | * | 9/2000 | Amirijoo | 455/456 |
| 6,208,628 B1 | * | 3/2001 | Monrad et al. | 370/328 |
| 6,230,012 B1 | * | 5/2001 | Wilkie et al. | 455/435 |
| 6,349,224 B1 | * | 2/2002 | Lim | 455/575 |

FOREIGN PATENT DOCUMENTS

| | | | | |
|---|---|---|---|---|
| FI | WO 98/32299 | * | 7/1998 | H04Q/7/22 |
| WO | 95/28063 | | 10/1995 | |
| WO | 96/07277 | | 3/1996 | |
| WO | 98/32299 | | 7/1998 | |
| WO | 98/59505 | | 12/1998 | |

* cited by examiner

Primary Examiner—Thanh Cong Le
Assistant Examiner—Stephen M. D'Agosta
(74) Attorney, Agent, or Firm—Pillsbury Winthrop LLP

(57) ABSTRACT

A support node (SGSN) in a packet radio network, the node being adapted to support mobile station location updates and data transmission to and/or from a mobile subscriber. A first address (IP1) has been appointed for the support node and it corresponds to the area served by the support node in the packet radio network. In addition, a second address (IP2) has been appointed to the support node (SGSN) and it belongs to the same address system as said first address (IP1). The second address (IP2) is used substantially for data transmission and . the first address (IP1) is used substantially for signaling outside data transmission. The area served by the support node is preferably divided into subareas, to each of which a second address (IP2) is appointed, and a mobile subscriber location update is informed to the home location register (HLR) only when the support node (SGSN) serving the mobile subscriber changes, but not when the subarea changes. The support node is preferably modular in such a way that there are a plurality of data transmission blocks (53), each of them serving a dedicated subarea and using its dedicated second address (IP2, IP2', IP2").

9 Claims, 4 Drawing Sheets

REDUCTION OF SIGNALING LOAD IN PACKET RADIO NETWORK

This application is the national phase on international application PCT/FI99/00089 filed Feb. 8, 1999.

BACKGROUND OF THE INVENTION

The invention relates to a GPRS type of packet radio network and more specifically to reduction of signaling load therein as a mobile station changes routing areas.

A General Packet Radio Service (GPRS) is a new service in the GSM. It is one of the items that are being standardized in GSM (Global System for Mobile Communication) phase 2+ at the ETSI (European Telecommunication Standard Institute). The GPRS operational environment consists of one or more sub-network service areas that are interconnected by a GPRS backbone network. A sub-network comprises a number of packet data service nodes, which are herein called GPRS support nodes (or agents) and each one of which is connected to the GSM mobile network so that it can provide packet data service for mobile data terminals via several base stations, i.e. cells. An intermediate mobile network provides circuit-switched or packet-switched data transmission between a support node and the mobile data terminals. Different sub-networks, in turn, are connected to an external data network, for example to a Public Switched Packet Data Network (PSPDN). The GPRS service can thus be used for effecting packet data transmission between mobile data terminals and external data networks, with the GSM network functioning as an access network. One of the features of the GPRS service network is that it operates almost independently. of the GSM network. One of the requirements set for the GPRS service is that it must operate together with different types of external PSPDN networks, such as the Internet and X.25 networks. In other words, the GPRS service and the GSM network should be able to serve all users, irrespective of the type of data networks that they wish to be connected to via the GSM network. This means that the GSM network and GPRS service must support and process different network addressing methods and data packet formats. The data packet processing also comprises routing of packets in a packet radio network. In addition, users should be able to roam from their home GPRS network to a visited GPRS network.

FIG. 1A illustrates a typical arrangement in a GPRS network. The architecture of GPRS networks is not as mature as that of the GSM networks. All GPRS terms should therefore be understood as being descriptive rather than limiting. A typical mobile station forming a mobile data terminal consists of a mobile station MS in a mobile network and of a portable computer PC connected to the data interface of the MS. The mobile station may be, for example Nokia 2110, manufactured by Nokia Mobile Phones Ltd., Finland. By means of a PCMCIA type Nokia Cellular Datacard, manufactured by Nokia Mobile Phones Ltd., the mobile station can be connected to any portable personal computer PC that has a PCMCIA card slot. The PCMCIA card thus provides the PC with an access point that supports the protocol of the telecommunication application used in the PC, such as the CCITT X.25 or Internet Protocol IP. Alternatively, the mobile station can directly provide an access point that supports the protocol used by the PC application. Further, a mobile station 3 and a PC 4 can be integrated to form a single unit, within which the application is provided with an access point that supports the protocol used by it. An example of such a mobile station with an integrated computer is a Nokia Communicator 9000, manufactured by Nokia Mobile Phones Ltd., Finland.

Network elements BSC and MSC are previously known from a typical GSM network. The arrangement of FIG. 1A comprises a separate Serving GPRS Support Node (SGSN). The support node controls certain operations of the packet radio service on the network side. The operations include logging on and off the system by the mobile stations MS, routing area updates by mobile stations MS, and data packet routing to correct destinations. In the present application, the term 'data' should be understood in the wide sense to refer to any information transmitted to/from a terminal in a digital telecommunication system. The information can comprise speech encoded into digital form, data communication between computers, telefax data, short segments of program code, etc. Information outside data transmission, such as subscriber data and related inquiries, routing area updates etc., is called signaling. The SGSN node can be located at a base station BTS, at a base station controller BSC or at a mobile switching center MSC, or it can be separate from all these elements. The interface between the SGSN node and the base station controller BSC is called a GB interface. An area managed by one base station controller BSC is called a Base Station Subsystem BSS.

The intermediate mobile network provides packet-switched data transmission between a support node and mobile data terminal equipment. Different sub-networks, in turn, are connected to an external data network, for example to a PSPDN, via a specific GPRS gateway support node GGSN. Packet data transmission between mobile data terminals and external data network functioning as an access network. Alternatively, the gateway node GGSN can be replaced with a router. In the following, the term 'gateway node GGSN' is also to be understood to refer to a structure in which the gateway has been replaced with a router.

In FIG. 1A the GPRS network connected to the GSM network comprises a number of serving GPRS support nodes SGSN and one gateway GPRS support node GGSN. The different support nodes SGSN and GGSN are interconnected via an intra-operator backbone network. It is to be understood that a GPRS network may comprise any number of support nodes SGSN and gateway nodes GGSN.

Each support node SGSN manages a packet data service in the area of one or more nodes in a cellular packet radio network. To achieve this, each support node SGSN is connected to a certain local part of the GSM system, typically to a mobile services switching center, but in some situations it may be preferable to connect it directly to a base station subsystem BSS, i.e. to a base station controller BSC or a base station BTS. A mobile station MS in a cell communicates with a base station BTS over a radio interface and further through a mobile network with the support node SGSN to the service area of which the cell belongs. In principle, the mobile network between the support node SGSN and the mobile station MS only transmits packets between these two. For this purpose, the mobile network can offer either a circuit-switched connection or packet-switched data packet transmission between a mobile station MS and a serving support node SGSN. An example of a circuit-switched connection between a mobile station MS and an agent is presented in FI 934115. An example of packet-switched data transmission between a mobile station MS and an agent is presented in FI940314. It should be noted, however, that a mobile network provides only a physical connection between a mobile station MS and a support node SGSN, and that its exact operation and structure are not relevant to the invention.

An intra-operator backbone network 11 interconnecting an operator's SGSN and GGSN can be implemented by a local area network, for example. It should be noted that an operator's GPRS network can also be implemented without an intra-operator backbone network, by implementing all features in a single computer, for example, but this does not cause any changes in the call set-up principles according to the present invention.

A GPRS gateway node GGSN connects an operator's GPRS network to other operator's GPRS networks and to data networks, such as an inter-operator backbone network 12 or an IP network. An Interworking Function IWF can be arranged between the gateway node GGSN and the other networks, but usually the GGSN is simultaneously the IWF. The inter-operator backbone network 12 is one through which the gateway nodes GGSN of different operators can communicate with one another. The communication is needed to support GPRS roaming between the different GPRS networks.

The gateway node GGSN is also used for storing the location information of the GPRS mobile stations. The GGSN also routes mobile-terminated (MT) data packets. The GGSN also contains a database that associates the mobile station's network address in an IP network or an X.25 network (or simultaneously in more than one network) with the mobile station identifier in a GPRS network. When the mobile station roams from one cell to another within the area of one support node SGSN, a routing area update is needed only in the support node SGSN, and the gateway node GGSN need not be informed of the change of routing area. When the mobile station roams from a cell of one support node SGSN to a cell of another SGSN within the area of the same or a different operator, an update is also performed in the (home) gateway node GGSN so as to store the identifier of the new, visited support node and the identifier of the mobile station.

A home location register HLR is also used to authenticate subscribers at the beginning of a GPRS session. It contains a definition between a subscriber's PDP (Packet Data Protocol) address (addresses) and the subscriber's IMSI (International Mobile Subscriber Identity). In a GSM network a subscriber is identified on the basis of the IMSI. In FIG. 1A the HLR is connected through SS7 (Signaling System 7), for example to a mobile switching center MSC and an intra-operator backbone network. Between the SS7 signaling system and the intra-operator backbone network there can be a direct connection or an SS7 gateway node. In principle, the HLR can exchange packet-switched messages with any GPRS node. The HLR's method of communication and its connection to the GPRS network are not, however, essential to the invention.

When packet data is sent to a mobile station, the data will be routed to the correct GSM network via the gateway node GGSN to the support node SGSN in which the location of the mobile station is known. If the mobile station is in standby mode, its location is known with the accuracy of a Routing Area (RA). Correspondingly, if the mobile station is in ready mode, its location is known with the accuracy of a cell.

FIG. 1B shows signaling associated with routing area maintenance. For the sake of clarity, FIG. 1B is highly simplified and only shows the most essential messages. Resource reservations and releases, for example, known by a person skilled in the art, are not shown.

In step 1-1 a mobile station MS registers in the network and sends to the network a Routing Area Update message, which is relayed to a node $SGSN_1$. In step 1-2 the SGSN, relays the message to the home location register HLR. In steps 1-3 and 1-4 corresponding acknowledgements are sent to the node SGSN, and to the mobile station MS. At the horizontal broken line in FIG. 1B, the mobile-station MS moves from the area of the node SGSN, to the area of a node $SGSN_2$. Steps 1-5 to 1-8 correspond to steps 1-1 to 1-4 except that this time the routing area update message passes via the node $SGSN_2$. In addition, in step 1-9 the home location register HLR sends a routing area cancellation to the node SGSN, which deletes the data on the mobile station MS from its register. The assumption in FIG. 1B is that the mobile station MS roams within the area of its home network. Should the mobile station MS roam in a visited network (e.g. network 1), the routing area update should be routed further via the gateway nodes GGSN to the home network (similarly to network 2).

A problem in the above prior art arrangement is the great signaling load generated on the one hand between the support node SGSN and the gateway node GGSN and on the other hand between the support node SGSN and the home location register HLR. Particularly much signaling load is generated when the support node SGSN has a small service area. In that case a roaming mobile station causes much signaling in the network (routing area updates). Every time a mobile station MS moves from the area of an old support node (e.g. $SGSN_1$) to the area of a new support node (e.g. $SGSN_2$), it sends a routing area update message to the network. This generates signaling between the gateway node GGSN and both support nodes SGSN. The problem is at its worst when the mobile station roams within the area of another network than its home network, since information on a change in routing areas has to be relayed all the way to the home network of the mobile station.

Furthermore, prior art GPRS recommendations suggest that information on the location of a mobile station MS always be maintained in the network home location register HLR. It is obvious that continuous updating of the location of all mobile stations in the network in one network element (home location register) causes unreasonable load to said network element.

BRIEF DESCRIPTION OF THE INVENTION

It is thus an object of the invention to provide a method and an apparatus for implementing the method so as to solve the above problems related to heavy signaling load and the load on the home location register HLR. The objects of the invention are achieved by a method and an arrangement, characterized by what is disclosed in the independent claims. The preferred embodiments of the invention are disclosed in the dependent claims.

The invention is first of all based on the observation that an SGSN node capable of dealing with a large number of messages within an extensive area is difficult to implement by conventional technology. In other words, conventional technology provides poor scalability for an SGSN node.

The invention is also based on complementing the functionality of the support node SGSN in the following manner. A support node according to a preferred embodiment of the invention has a plurality of IP addresses intended for data transmission and to deal with given routing areas. A support node of the invention needs (as does a conventional support node) only one SS7 address and one control IP address (hereinafter also IP1). Internal control functions of a support node of the invention manage the mobility of mobile stations and maintain information on which data transmission IP address is serving each mobile station at each particular time. Information on a change in IP addresses within the area of the same support node is relayed to the gateway node GGSN, but not to the home location register HLR. Information on the movement of a mobile station is relayed to the home location register only in case the support node serving the mobile station changes.

One application of the invention is such that data transmission IP addresses handle a given number of active connections but are not tied to a given area. In this case location update is not even needed to the gateway node in updating an internal routing area of the support node. The structure of the support node and the distribution of tasks between different parts remain otherwise the same in this interpretation.

An advantage of the invention is significant reduction in signaling need and the load on the home location register HLR. Another advantage is that a support node can be scaled very well, i.e. its capacity can be increased flexibly by increasing blocks, or modules, serving data transmission. A dedicated IP address (hereinafter also IP2, IP2', IP2" etc.) for data transmission is given to each data transmission module. Good scalability again provides the advantage that network planning becomes flexible since with increasing traffic the network architecture does not have to be changed (e.g. to increase support nodes), but the capacity of existing support nodes can be increased flexibly.

Some advantages of the invention, such as good scalability, are achieved simply by modular implementation of a support node. In other words, the parts serving data transmission constitute a separate module and the support node comprises already upon installation the mechanical, electrical and software facilities for multiple module installation. The changes needed in other network elements are minimal or no changes are needed at all.

BRIEF DESCRIPTION OF THE DRAWINGS

In the following the invention will be described in connection with preferred embodiments with reference to the attached drawings, in which.

DETAILED DESCRIPTION OF THE INVENTION

Figure 2:
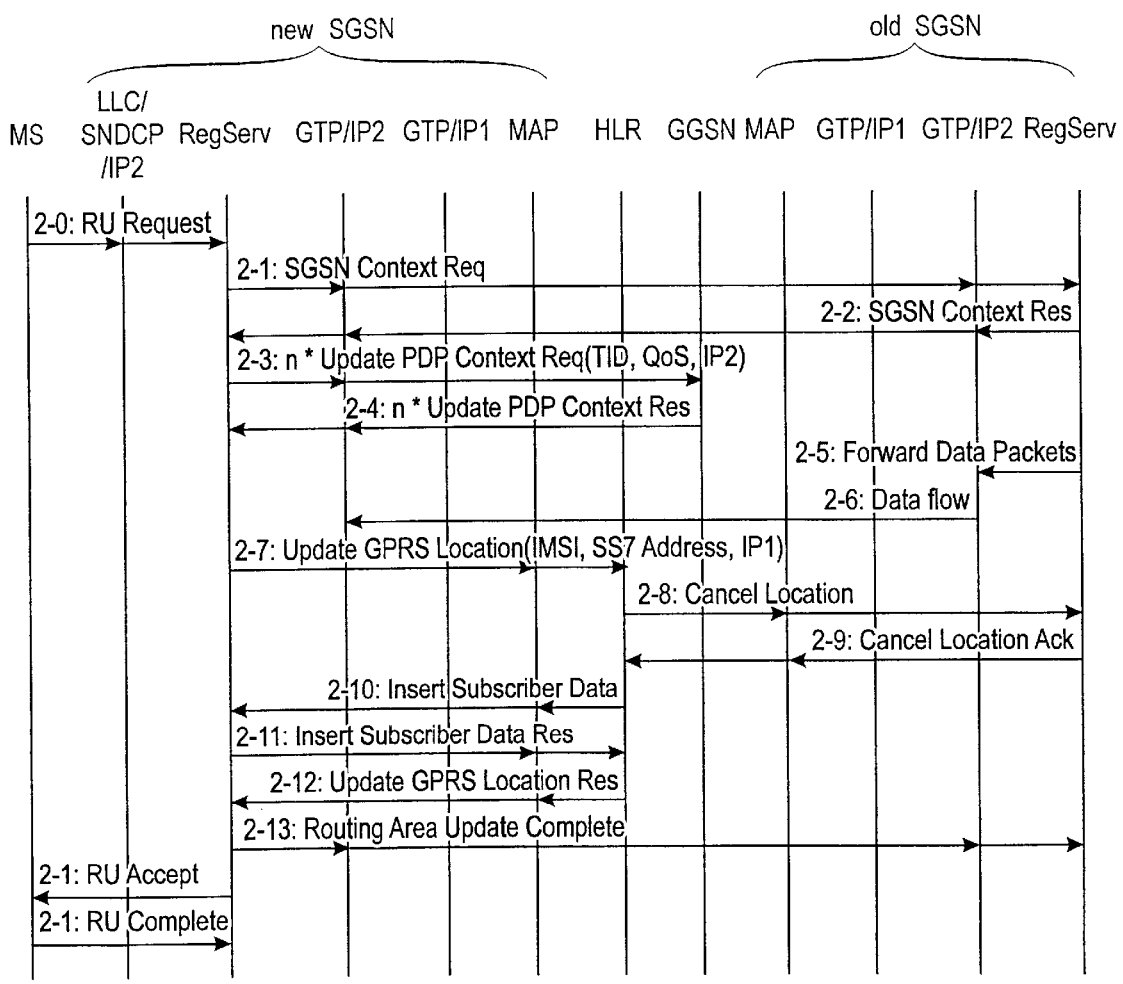
FIG. 2 shows signaling related to routing area maintenance in accordance with an embodiment of the invention as the support node serving a mobile station changes.

FIG. 2 shows a routing area update between two support nodes SGSN according to the invention. In FIG. 2 GTP refers to data transmission services and MAP to signaling services. Other internal blocks of the support node are described in greater detail in connection with FIG. 5. In step 2-0 a mobile station MS sends a routing area update request to a new support node SGSN. The SGSN node has at its disposal a list of routing area pairs indicating the correlation between the IP addresses of that particular and other SGSN nodes and the routing areas. The SGSN is aware of the routing areas of its own data transmission modules IP address-specifically. The SGSN is able to see the pairs of IP addresses and routing areas of other SGSN nodes in two ways: the SGSN sees the routing areas of other SGSN nodes associated either with their control IP addresses or directly combined to the IP addresses of the data transmission modules. FIG. 2 shows signaling that uses the latter mode. The advantage of this mode is that data is directly routed to the right address. Messages associated with creation, adaptation and removal of tunnels have to be sent via a data transmission IP address. The new support node deduces the IP address of the old support node on the basis of the old routing area identity sent by the mobile station (message 2-0).

In step 2-1 the new SGSN sends to the old SGSN node a message SGSN CONTEXT REQUEST requiring it to send PDP context data. This is carried out in step 2-2. In step 2-3 the new SGSN sends to the gateway node GGSN as many UPDATE PDP CONTEXT REQUEST messages as there are active connections associated with said mobile station. This number is denoted by n. As parameters the messages include at least TID (Tunnel Identity), QoS (Quality of Service) and IP2. The latter is the IP address that particular mobile station uses for data transmission. In step 2-4 the GGSN replies by sending n acknowledgements. In steps 2-5 and 2-6 the old SGSN (whose memory contains data addressed to the mobile station MS) sends the data addressed to the mobile station to the new SGSN node. (Steps 2-5 and 2-6 may also take place simultaneously or interleaved with steps 2-3 and 2-4). In step 2-7 the new SGSN sends to the home location register HLR a routing area update message UPDATE GPRS LOCATION, whose parameters include the mobile station's IMSI, the address of the SGSN node in the SS7 system and the IP1 address of the SGSN node, i.e. the IP address via which signaling to said mobile station takes place. In step 2-8 the HLR cancels the subscriber data on the mobile station from the old SGSN node. Step 2-9 is a corresponding acknowledgement. In step 2-10 the HLR sends subscriber data on the mobile station in a message INSERT SUBSCRIBER DATA. Steps 2-11 to 2-15 are notices of acceptance and acknowledgements of previously sent messages.

Figure 3:
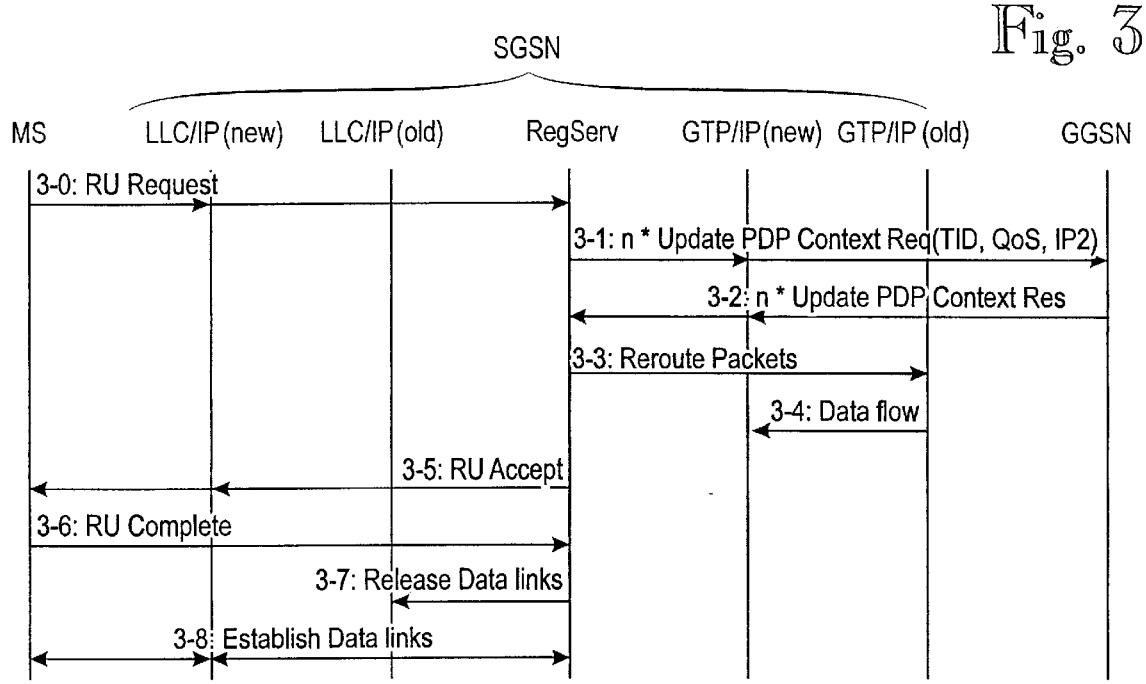
FIG. 3 shows internal signaling in a support node as the routing area of a mobile station and the data transmission module serving the mobile station change within the same support node.

FIG. 3 shows a routing area update within the area of a SGSN node of the invention as the IP2 address serving a mobile station changes. In step 3-1 the IP address of the new data transmission module is updated in the GGSN node for each active PDP context. In step 3-3 the new data transmission module informs that it is prepared to receive packets from the old data transmission module. Data transmission takes place in step 3-4. Finally, in steps 3-7 and 3-8, subscriber data transmission links are established to the new data transmission module and released from the old one. An essential difference between FIGS. 2 and 3 is that in the case of FIG. 3, a routing area update is not relayed to the home location register HLR when the routing area changes within the area of the same SGSN node.

Figure 4:
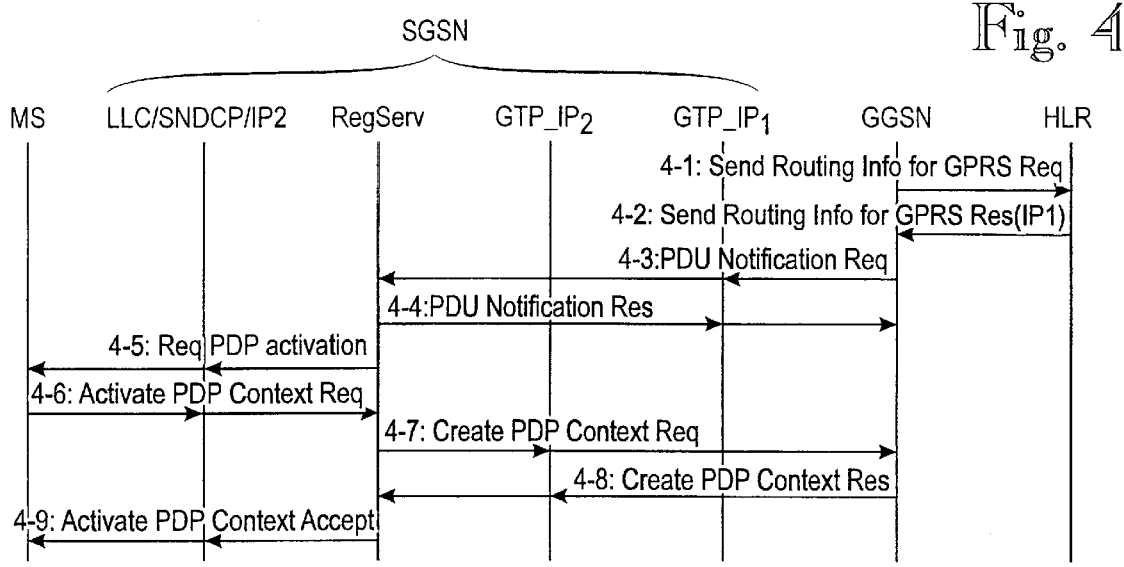
FIG. 4 shows a PDP context activation procedure initiated via a gateway node, initiated by the gateway node when it has received a data packet addressed to a mobile station.

FIG. 4 shows a PDP context activation procedure initiated via the gateway node GGSN. In this case the memory of the gateway node comprises data addressed to a mobile station, but it does not have an active PDP context associated with the mobile station. In step 4-1 the GGSN inquires the home location register for routing data, which the home location register returns in step 4-2. In step 4-3 the GGSN informs the support node SGSN that data is incoming to the mobile station and asks the support node to activate the PDP context. In step 4-5 the SGSN asks the mobile station to send a PDP context activation request, which it does in step 4-6. In step 4-7 the support node SGSN asks the gateway node GGSN to create in its memory a PDP context for said mobile station, which the GGSN acknowledges in step 4-8. In step 4-9 the SGSN informs the mobile station of acceptance of context activation.

Figure 5:
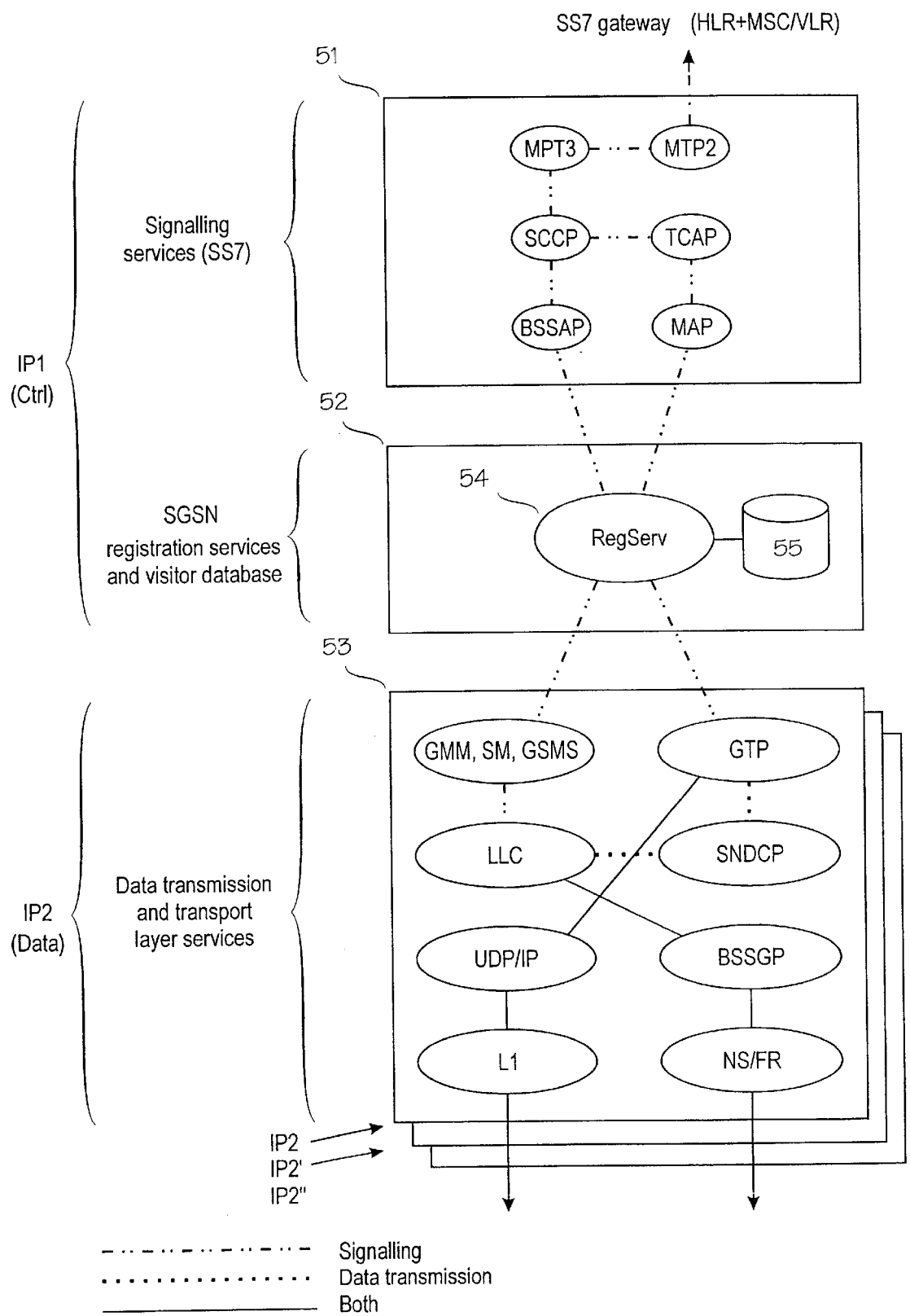
FIG. 5 is a block diagram showing a preferred implementation of a support node of the invention.

FIG. 5 shows the block diagram of a SGSN node according to a preferred embodiment of the invention. The SGSN node comprises three main blocks: SS7 signaling services (for the SS7 gateway) 51, SGSN registration services 52 and data transmission/transport layer services 53. Together, blocks 51 and 52 correspond to block GTP/IP1 in the signaling diagram, block 53 corresponding to block GTP/IP2. The division between blocks 51 and 52 is not essential to the invention; they may be in the same block, i.e. module. In contrast, it is essential that there may be more than one data transmission/signaling blocks 53. In other words, the support node comprises at least the mechanical, electrical and software interfaces, or facilities for supporting a plurality of blocks, i.e. modules 53, each module 53 having its dedicated IP address. This means that as traffic increases, the data transmission capacity of the support node can be easily increased.

Via block 51 the SGSN node has one common SS7 interface to the home location register HLR and the mobile switching centres MSC/VLR. Block 51 is responsible for the execution of the protocols shown in FIG. 5. These protocols are known to a person in the art from ITU-T recommendations.

Block 52 comprises subscriber registration services 54 and a visitor database 55. The latter is used for storing subscriber data, active PDP Context data and the IP2 address serving the mobile station (identity of block 53).

Block 53 implements the data transmission/transport layer services of the SGSN node. In the example of FIG. 5, block 53 implements following tasks or protocols:

GMM=GPRS Mobility Management
SM=Session Manager
GSMS=GPRS Short Message Service
LLC=Logical Link Control, OSI model link layer
BSSGP=BSS GPRS Protocol
GTP=GPRS Tunneling Protocol
SNDCP=Subnetwork Dependent Convergence Protocol
UDP/IP=User Datagram Protocol/Internet Protocol
L1=Layer 1, interface of $1^{st}$ layer of an OSI model to e.g. a local area network
NS/FR=Network Services/Frame Relay for relaying data packets to other network elements.

The first three protocols together form the RIL-3 layer (Radio Interface Layer 3) protocols between a mobile station and a support node SGSN. All these tasks and protocols are known per se from the conventional GPRS network and SGSN node. The novelty is to generate an SGSN node in which blocks or modules 53 intended for data transmission may be duplicated as traffic increases, so that each data transmission block has a dedicated IP address for data transmission (IP2, IP2' etc.).

Figure 1A:
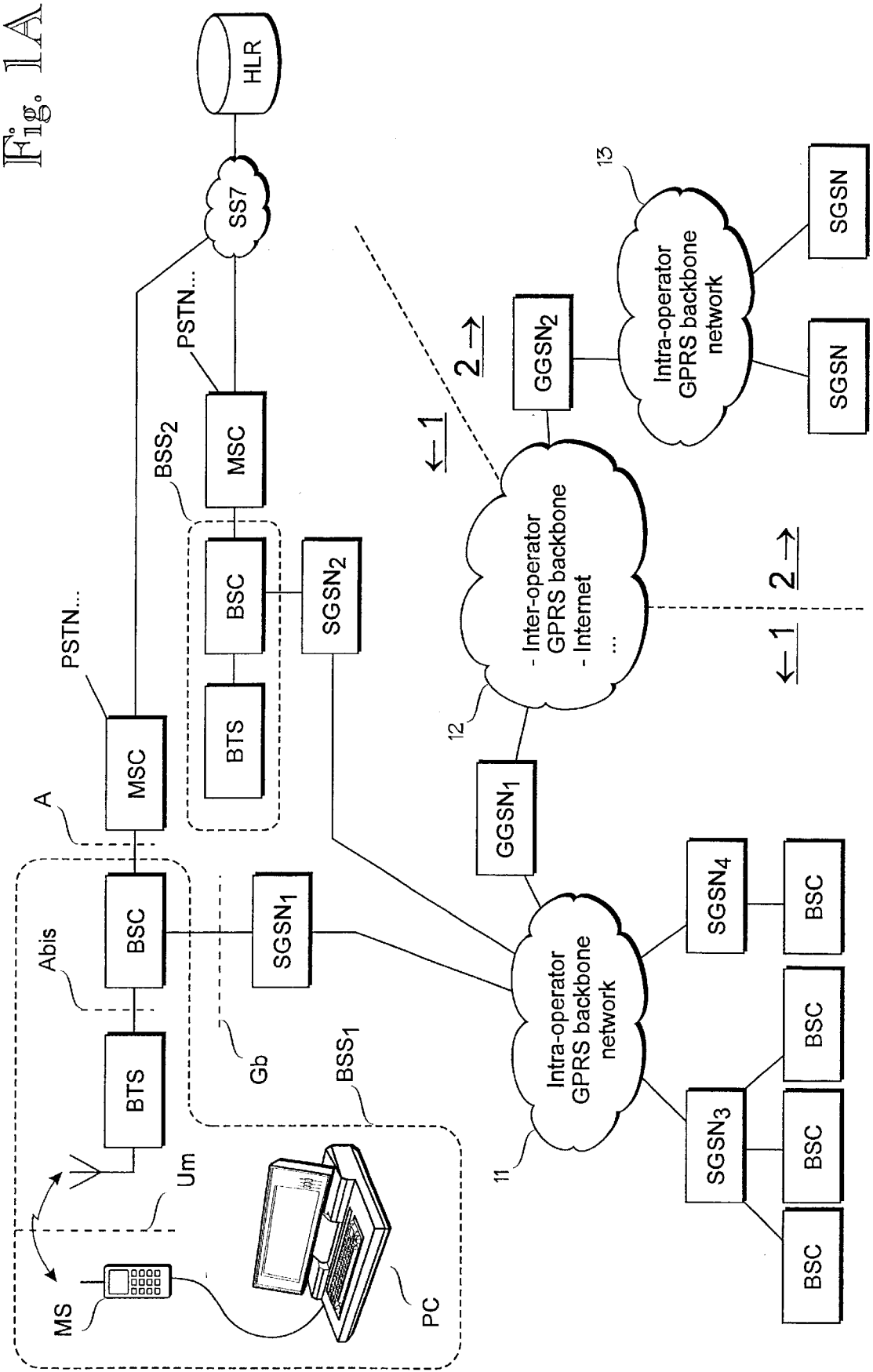
FIG. 1A shows prior art architecture of a packet network.
Figure 1B:
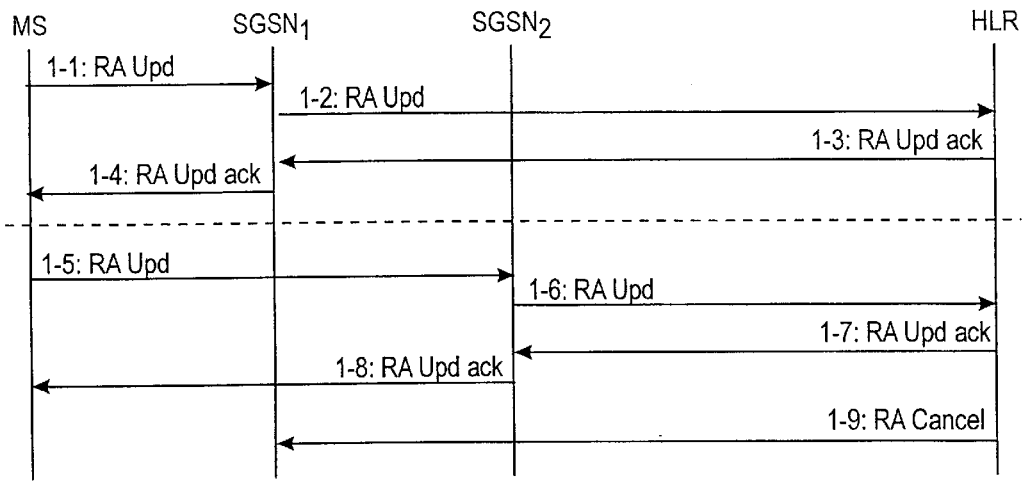
FIG. 1B shows prior art routing area update on a general level.

FIG. 5 shows the internal structure of the support node SGSN of the invention. The effect of the invention on network architecture can be seen in that the support node of the invention is capable of serving a significantly larger geographical area than a conventional support node. In FIG. 1A, for example, one SGSN according to the invention could perform the tasks of the nodes $SGSN_1$ and $SGSN_2$ in such a manner that both conventional support nodes would be replaced by a data transmission module 53 of the support node according to the invention. The standards do not define the number of base station systems that can be associated with one support node. This depends mainly on the capacity of the support node, which by means of the invention can be significantly improved. In FIG. 1A, the $SGSN_3$ serves three base station controllers BSC.

The invention has been described by way of example in the GSM/GPRS network, but it is not, however, restricted thereto. The support node of the invention may be an SGSN node of a GPRS network, but it may equally well be what is known as a third generation mobile system PDAN node (Packet Data Access Node).

What is claimed is:

1. A method of maintaining the location of a mobile subscriber (MS/PC) in a packet radio network comprising at least one of each of the following network elements: a support node (SGSN), a home location register (HLR) and a mobile switching center (MSC/VLR);

in which method:
permanent subscriber data on a mobile subscriber is maintained in the home location register and data pertaining to each active connection in the support node serving the mobile subscriber at each particular time;
for each support node, a first address (IP1) corresponding to the entire area served by that support node is defined for signaling associated with a mobile subscriber location update;
information on a mobile subscriber location update is transferred from the support node to the home location register when the support node serving the mobile subscriber changes;
characterized by
defining for the support node at least one second address (IP2) which is an address in the same address system as said first address (IP1);
the second address (IP2) being used substantially for data transmission to or from a mobile subscriber and the first address (IP1) being used substantially for signaling outside data transmission.

2. A method as claimed in claim 1, characterized by dividing the area served by the support node (SGSN) into subareas, for each of which a separate second address (IP2, IP2', IP2") is defined; and informing a mobile subscriber (MS/PC) location update to the home location register (HLR) only when the support node (SGSN) serving the mobile subscriber changes, but not when the mobile subscribers subarea changes.

3. A method as claimed in claim 2, characterized by informing a mobile subscriber (MS/PC) location update to a gateway node (GGSN) when the mobile station's subarea and, along therewith, the second address (IP2, IP2', IP2") change.

4. A method as claimed in claim 1, characterized by said second address (IP2) also corresponding to the entire area served by said support node.

5. A support node (SGSN) in a packet radio network, the node being adapted to serve a mobile subscriber (MS/PC) in a telecommunication system comprising a home location register (HLR) and at least one mobile switching center and visitor location register (MSC/VLR), wherein the support node is adapted to support mobile station location updates and data transmission to and/or from the mobile subscriber;

the support node is given at least one first address (IP1) corresponding to the area served by the support node in the packet radio network;

characterized by assigning to the support node (SGSN) at least one second address (IP2) which is an address in the same address system as said first address (IPI);

the second address (IP2) being used substantially for data transmission and the first address (IP1) being used substantially for signaling out-side data transmission.

6. A support node as claimed in claim 5, characterized by being adapted to support an arrangement wherein:

the area served by the support node (SGSN) is divided into subareas, for each of which a separate second address (IP2, IP2', IP2") is defined;

a mobile subscriber (MS/PC) location update is informed to the home location register (HLR) only when the support node (SGSN) serving the mobile subscriber changes, but not when the subarea of the mobile subscriber changes.

7. A support node as claimed in claim 6, characterized by being adapted to inform a mobile subscriber (MS/PC) location update to a gateway node (GGSN) when the subarea of the mobile station and, along therewith, the second address (IP2, IP2', IP2") change.

8. A support node as claimed in any one of claims 5 to 7, characterized by comprising a signaling block (51) for connecting to a network home location register and/or mobile switching centres (MSC/VLR), preferably via the SS7 signaling system;

a data transmission block (53) for relaying data packets to and from a mobile subscriber;

a register block (52) for storing subscriber and context data and for maintaining mobile subscriber locations together with the signaling blocks (51) and the data transmission blocks (53); wherein a first address (IP1) is defined for the signaling block (51) and a second address (IP2) is defined for the data transmission block (53).

9. A support node as claimed in claim 8, characterized by being adapted to support a plurality of data transmission blocks (53, 53', 53") installed therein, each serving a predetermined area in the packet radio network and each having a separate defined second address (IP2, IP2', IP2");

monitor mobile subscriber (MS/PC) locations and appoint the most suitable of the data transmission blocks (53, 53' 53") comprised by the support node to serve the mobile subscriber;

inform the home location register (HLR) of a mobile subscriber (MS/PC) location update only when the support node (SGSN) serving the mobile subscriber changes, but not when the data transmission block (53, 53', 53") changes in the same support node.

* * * * *